United States Patent [19]
Kato et al.

[11] Patent Number: 4,621,905
[45] Date of Patent: Nov. 11, 1986

[54] FAST COMPACT ZOOM LENS

[75] Inventors: Masatake Kato; Muneharu Sugiura, both of Tokyo, Japan

[73] Assignee: Canon Kabushiki Kaisha, Tokyo, Japan

[21] Appl. No.: 644,535

[22] Filed: Aug. 27, 1984

[30] Foreign Application Priority Data

Aug. 31, 1983 [JP] Japan .................. 58-159653

[51] Int. Cl.⁴ .............................. G02B 15/14
[52] U.S. Cl. ....................................... 350/427
[58] Field of Search .................. 350/427, 423

[56] References Cited

FOREIGN PATENT DOCUMENTS

2832486  2/1979  Fed. Rep. of Germany ...... 350/427

Primary Examiner—John K. Corbin
Assistant Examiner—Rebecca D. Gass
Attorney, Agent, or Firm—Toren, McGeady, Stanger, Goldberg & Kiel

[57] ABSTRACT

A fast compact zoom lens comprising a varifocal section followed on its image side by an image forming section, the varifocal section including, from front to rear, a first lens unit of positive power for focusing, a negative second lens unit movable for variation of the magnification, a third lens unit movable along with the second lens unit to compensate for the image shift, and a positive fourth lens unit stationary during zooming. The image forming section includes a front unit and a rear unit with an air space therebetween, the front unit consisting of a positive lens with its front surface being a strong refracting surface and convex to the front, a meniscus negative lens concave to the front, and a positive lens with its front surface being a strong refracting surface and convex to the front, and the rear unit consisting of a negative meniscus lens convex to the front, a positive meniscus lens concave to the front, and a positive lens with its front surface being a strong refracting surface and convex to the front.

2 Claims, 16 Drawing Figures

FAST COMPACT ZOOM LENS

BACKGROUND OF THE INVENTION

1. Field of the Invention

This invention relates to zoom lenses and, more particularly, to zoom lenses suited to video cameras.

2. Description of the Prior Art

Since the image pickup elements of the video cameras generally have a low sensitivity, the photographic lenses for use therewith are desired to be as fast as possible. It is also desired to shorten the photographic lens in the longitudinal direction for the purpose of achieving a reduction of the bulk and size of the video camera. These desires relate to the fact that though the image pickup tubes used in the video cameras have generally been of ⅔ in. size, from the standpoints of compactness and image quality, it is in recent years that people, seeking a further improvement in manageability and reduction of price, have sought the realization of a so-called 8 m/m video camera the size and weight of which are on the same order as those of the 8 m/m cine camera. Along with this, the image pickup tube itself must be reduced in size. For this reason, at least for present purpose the ½ in. tube is employed.

For the ⅔ in. tube, to remedy the low sensitivity of the tube, the lens had to be as fast as about F/1.4. For the ½ in. tube, however, because its image receiving area is equal to ½ times that of the ⅔ in. tube, the speed of the lens is necessarily at least F/1.2. To realise a zoom lens of as high a relative aperature as F/1.2, it is required to better correct the residual aberrations of the varifocal section than was heretofore possible. For this reason, how to design the image forming lens section becomes more important than ever. The use of known lens design techniques generally results in making it more difficult to correct spherical aberration in the central zone of the image field, and comatic aberrations and sagittal halo in the intermediate to the marginal zone as the relative aperture increases. Accordingly, there was a drawback in that the contrast was caused to be lowered. This tendency became prominent particularly when a great advance in the compactness of the lens system was aimed at.

SUMMARY OF THE INVENTION

An object of the present invention is to provide a large relative aperture or high speed zoom lens.

A second object is to achieve a great advance in the compactness of the lens.

A third object is to provide an image forming section suited to cancel the residual aberrations of the varifocal section so that the spherical aberration in the central zone of the image format and the coma and sagittal halo in the intermediate to the marginal zone are well corrected.

DETAILED DESCRIPTION OF THE PREFERRED EMBODIMENTS

Figure 1:
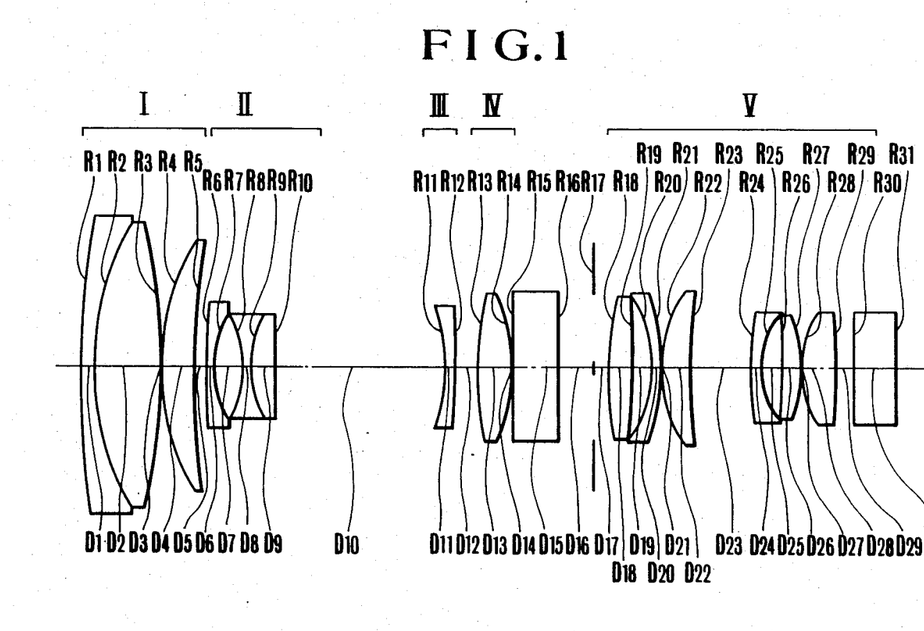
FIGS. 1 to 4 are lens block diagrams of specific embodiments 1 to 4 of the present invention respectively.
Figure 2:
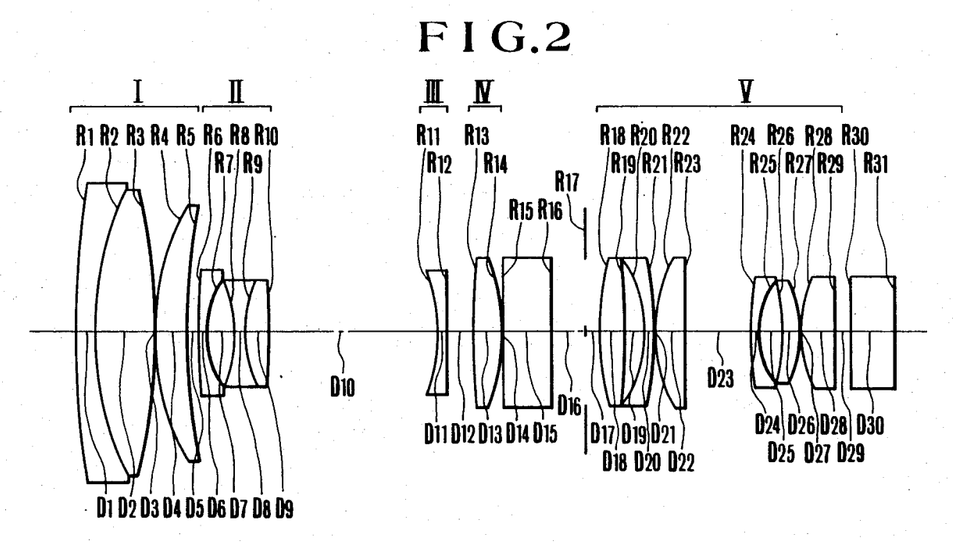
Figure 3:
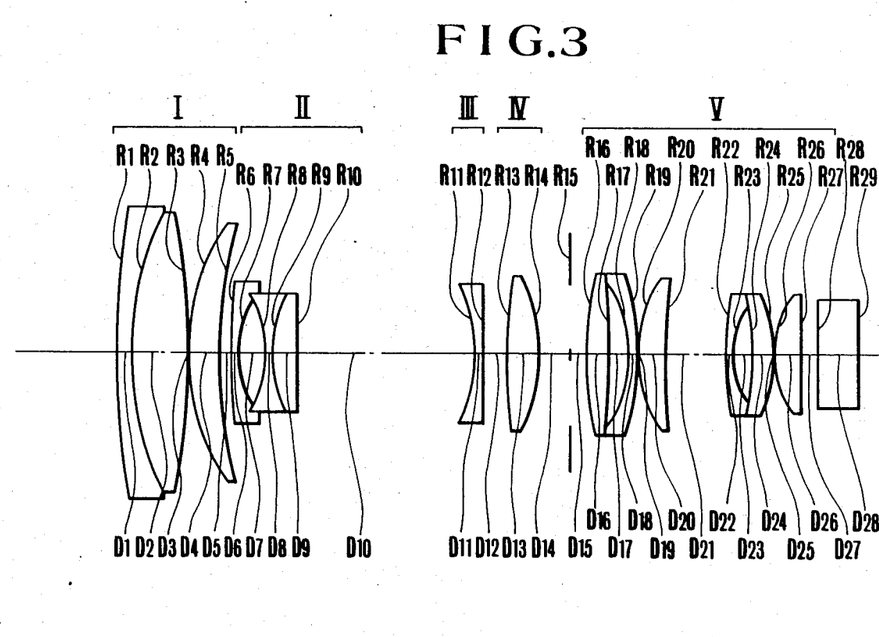
Figure 4:
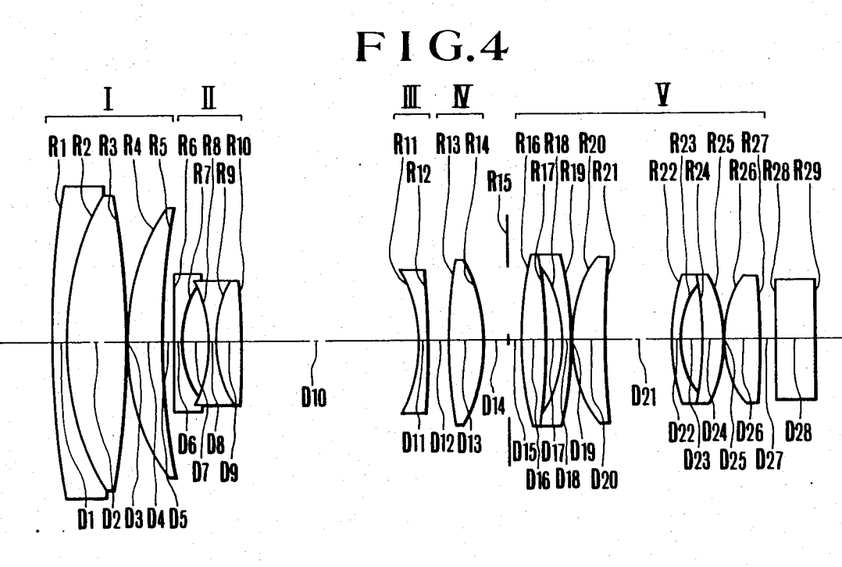

The lens configurations of the embodiments of the invention are shown in FIGS. 1 to 4. In each of the embodiments, the zoom lens is constructed with, from front to rear, a first lens unit I of positive refractive power movable for focusing, a second lens unit II of negative refractive power having the function of varying the magnification power, a third lens unit III of negative refractive power for compensating for the shift of an image plane resulting from the variation of the magnification power, a fourth lens unit IV of positive refractive power having a collimating function and including a lens IV1 of biconvex form with its rear surface being a strong refracting surface, and, after a diaphragm, a fifth lens unit V having an image forming function. The fifth lens unit V is constructed with two lens units V1 and V2 of which the first V1, counting from the front, comprises three lenses with, from front to rear, the first lens V1-1 having a strong front refracting surface with both of its surfaces being convex, the second lens V1-2 of negative refractive power in the meniscus form concave toward the front, and the third lens V1-3 of positive refractive power with its front surface being a strong refracting surface, and the second lens unit V2 comprises three lenses with, from front to rear, the first lens V2-1 of negative refractive power in the meniscus form convex toward the front, the second lens V2-2 of positive refractive power in the meniscus form convex toward the rear, and the third lens V2-3 of positive refractive power with its front surface being a strong refracting surface.

It has already been known to provide for the above-described type of zoom lens with a fifth lens unit of which the front part comprises, from front to rear, positive, positive and negative lenses. This lens arrangement has been proven to be advantageous at reducing the bulk and size of the zoom lens to some extent. But, the spherical aberration particularly in the shortest focal length positions tends to be over-corrected. Further, inward coma is produced in the intermediate to the marginal zone of the image field. Since these aberrations are difficult to correct, the contrast of the image was caused to lower.

In the zoom lens of the invention, the lens unit V1 is designed in such a way as to comprise, from front to rear, positive, negative and positive lenses, thereby giving an advantage that good correction of the spherical aberration is stabilized over the entire range of focal lengths, and further the inward coma is also well corrected. Thus, the above-described drawback has been eliminated.

The form and construction and arrangement of the lens elements constituting the fourth lens unit IV, the lens unit V1 and the lens unit V2 are next described.

The lens IV1 of the lens group IV has a duty of converging the diverging rays of light from the lens group III to an almost afocal beam and is formed with its rear surface of strong curvature so as to produce as little spherical aberration and coma as possible. The lens V1-1 and lens V1-2 have a duty of correcting spherical aberration and longitudinal chromatic aberration and are positioned at a close distance to form an air lens therebetween by which the spherical aberration in the shortest focal length positions and the coma in the marginal zone of the image field are advantageously corrected.

The lens V1-3 has a duty of converging the rays of light and turns the strong refracting surface toward the front so as to produce as little spherical aberration as possible.

The lens V2-1 is formed with its rear surface of strong curvature so as to suppress the production of coma and particularly outward coma to as small a value as possible. Nevertheless there remain yet appreciable coma and halo of sagittal rays of the lens V2-1, which are well corrected by giving a strong opposite curvature to either of the confronting surfaces of the lenses V2-2 and V2-3.

The above-described rules of lens design are sufficient for achieving a zoom lens according to the present invention. To achieve a further improvement of the aberration correction, the following additional conditions should be preferably satisfied.

That is, letting RIV2 denote the radius of curvature of the rear surface of the lens IV1, RVi the radius of curvature of the i-th lens surface counting from the front in the fifth lens unit V, DVi the i-th lens thickness or air separation, NVi the refractive index for the spectral D line of the glass of the i-th lens element, fIV the focal length of the fourth lens unit IV, fV the focal length of the fifth lens unit V, and fV1 and fV2 the focal lengths of the lens units V1 and V2 respectively, (1) $0.8 < |RIV2/fIV| < 1.1$ (where $RIV2 < 0$)
(2) $1.3 < fV1/fV < 1.6$
(3) $1.5 < |RV1/RV3| < 3.0$ (where $RV1 > 0, RV3 < 0$)

(4) $0.5 < \left| \dfrac{RV2 - RV3}{RV2 + RV3} \right| < 0.9$ (5) $0.7 < RV5/fV < 0.9$ (6) $1.0 < \left| \dfrac{RV8 - RV9}{RV8 + RV9} \right| < 1.6$ (7) $0.3 < DV6/fV < 0.4$
(8) $1.6 < NV6 < 1.8$ are satisfied.

Each of the above-stated conditions is explained below.

Condition (1) concerns the fourth lens unit IV having the duty of converging the diverging rays from the first three units of the varifocal section to an almost afocal beam of rays. For a given power distribution over the first to the third lens units, from the condition that the varifocal section be an afocal system, it follows that the refractive power of the fourth lens unit IV is unequivocally determined. Hence, it is instructive that the lens IV1 is formed with its rear surface to a strong curvature so as to produce as little spherical aberration and coma as possible. But when the upper limit of condition (1) is exceeded, the refractive power of the front surface RIV1 of the lens IV1 is necessarily strengthened. Therefore, under-correction of spherical aberration results. When the lower limit is exceeded, the refractive power of the rear surface RIV2 becomes too strong to avoid deterioration of coma.

Condition (2) concerns the power distribution over the lens units V1 and V2 constituting the fifth lens unit V. Since, in the present invention, the aforesaid fourth lens unit IV is followed after an air space having the diaphragm by the fifth lens unit V, as compared with another case where the fifth lens unit V is arranged in contact with the fourth lens unit IV, the focal length of the fifth lens unit V can be made smaller to effect an equivalent shortest focal length of the entire system. This produces an advantage in that the shortening of the back focal distance facilitates a minimization of the bulk and size of the entire lens system. But if the lens unit V1 has a stronger refractive power than the lens unit V2, or the fifth lens units V is of the telephoto type, as in the prior art, despite the fact that there is an advantage that the degree of convergence of the rays incident on the lens unit V2 increases with decrease in the diameter thereof, each of the surfaces of the lenses constituting the lens unit V1 becomes too strong to perform good correction of aberrations with ease.

Since, in the present invention, its features allow for the focal length of the fifth lens unit to be minimized, it is by relatively weakening the refractive power of the lens unit V1 that the primary aberrations are well corrected while still permitting a valuable advance in the compactness to be achieved. When the upper limit of condition (2) is exceeded, the total length of the lens system is increased. Conversely when the lower limit is exceeded, the primary aberrations, particularly spherical aberration and coma, become difficult to correct.

Condition (3) is for correcting spherical aberration properly. When the upper limit is exceeded, over-correction of spherical aberration results. When the lower limit is exceeded, under-correction results.

Condition (4) concerns correction of spherical aberration. When the upper limit is exceeded, under-correction of spherical aberration results. When the lower limit is exceeded, over-correction results.

Condition (5) is for converging the rays at a good efficiency without causing production of spherical aberration as far as possible. When the upper limit is exceeded, the converging effect becomes insufficient, leading to increase the total length of lens. When the lower limit is exceeded, the spherical aberration is objectionably increased.

Condition (6) is for constructing the optical system in the compact form without causing production of coma as far as possible. When the upper limit is exceeded, the total length of the lens is increased. When the lower limit is exceeded, the outward coma is extremely increased, and this aberration becomes difficult to correct by any design of other lenses.

Condition (7) is for holding a proper spacing of the lens units V1 and V2 from each other so that both on-axis and off-axis aberrations are corrected in good balance. When the upper limit is exceeded, spherical aberration and longitudinal chromatic aberration are difficult to correct. When the lower limit is exceeded, astigmatism, coma and other off-axis aberrations become difficult to correct.

Condition (8) is for constructing the optical system in the compact form without causing production of spherical aberration as far as possible. When the upper limit is exceeded, under-correction of spherical aberration results. When the lower limit is exceeded, the total length of lens is increased.

It should be noted, in examples of specific zoom lenses of the invention to be described later, the fourth unit is shown as consisting of only one lens IV1, but may otherwise include an additional lens of negative power or may be constructed from a plurality of positive lenses of which the combined refractive power is equal to that of the lens IV1. Also in the zoom lens of the invention, the first lens unit may be used as the variator. This case is rather preferred, because a high zoom ratio can be easily achieved by the reduced total zooming movement.

The present invention has the above-described features, which when fulfilled provides realization of a zoom lens of compact form while still permitting good correction of aberrations to be achieved.

Numerical specific examples of the invention can be constructed in accordance with the data given in the following tables for the radii of curvature, R, the axial thicknesses and air separations, D, and the refractive indices, N, and the Abbe numbers, $\nu$, of the glasses of the lens elements with the subscripts numbered consecutively from front to rear.

R30 and R31 in numerical examples 1 and 2 and R28 and R29 in numerical examples 3 and 4 denote a face plate of the image pickup tube or a filter, used in the video camera.

R15 and R16 in numerical examples 1 and 2 define a glass block as a beam splitter for the finder optical system.

Figure 5A:
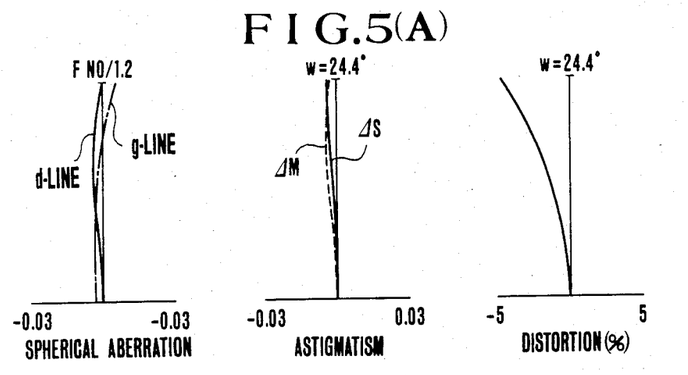
FIGS. 5(A), 5(B) and 5(C) are graphic representations of the aberrations of the lens of FIG. 1 in the wide angle end, an intermediate position and the telephoto end respectively.
Figure 5B:
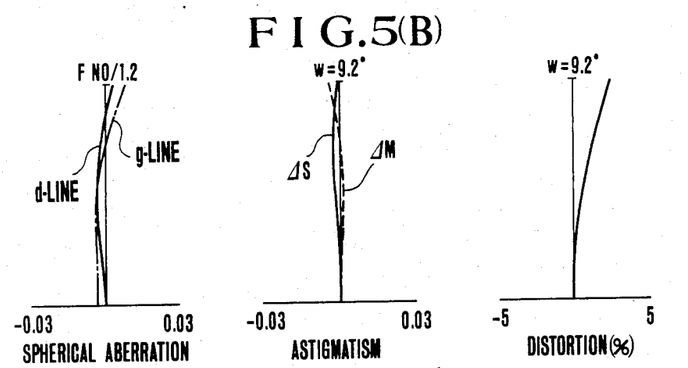
Figure 5C:
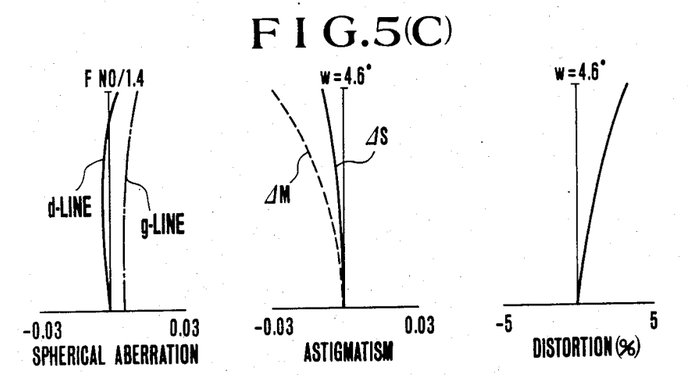
Figure 6A:
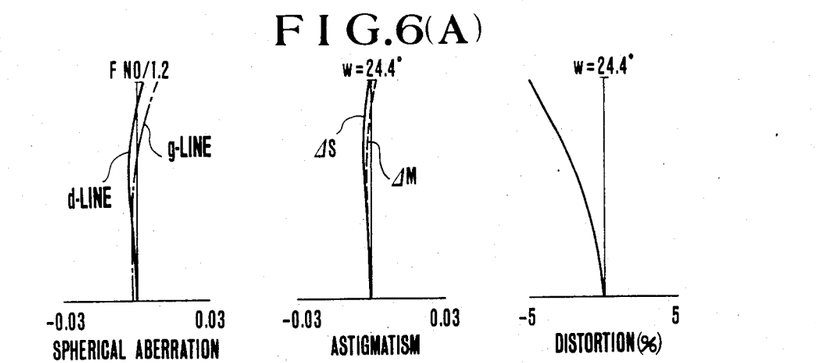
FIGS. 6(A), 6(B) and 6(C) are graphic representations of the aberrations of the lens of FIG. 2 in the wide angle end, an intermediate position and the telephoto end respectively.
Figure 6B:
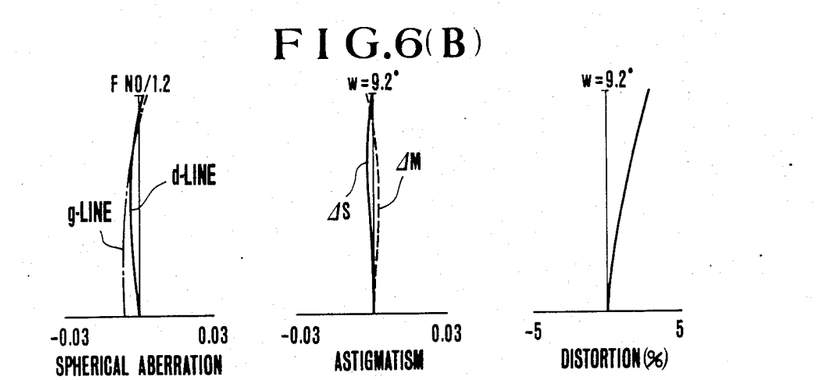
Figure 6C:
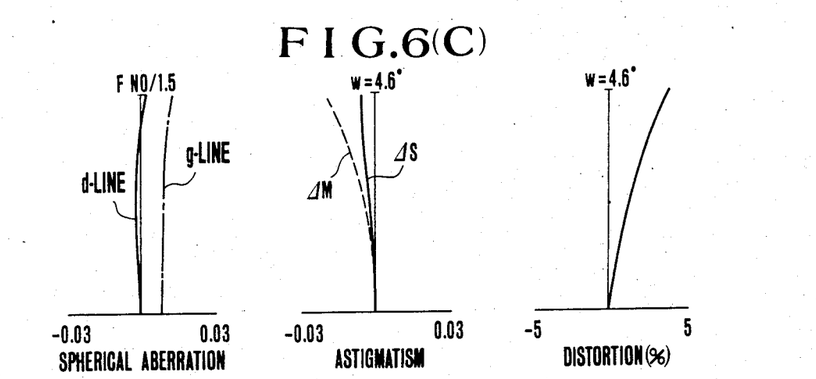
Figure 7A:
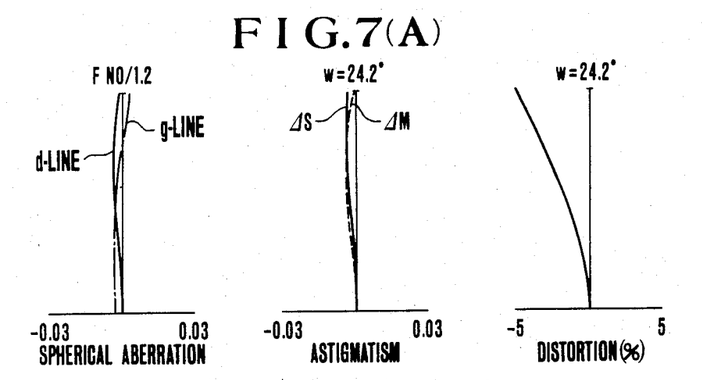
FIGS. 7(A), 7(B) and 7(C) are graphic representations of the aberrations of the lens of FIG. 3 in the wide angle end, an intermediate position and the telephoto end respectively.
Figure 7B:
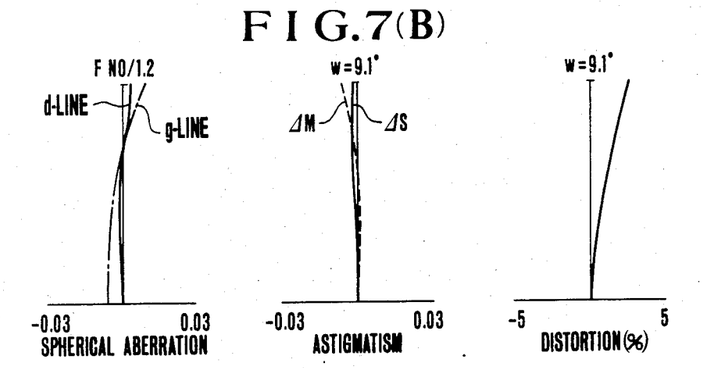
Figure 7C:
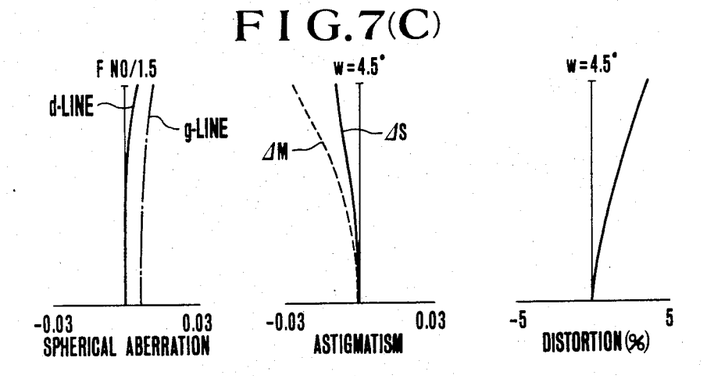
Figure 8A:
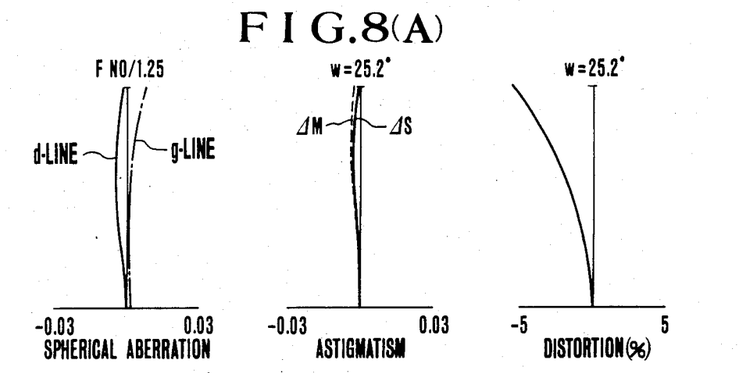
FIGS. 8(A), 8(B) and 8(C) are graphic representations of the aberrations of the lens of FIG. 4 in the wide angle, an intermediate position and the telephoto end respectively.
Figure 8B:
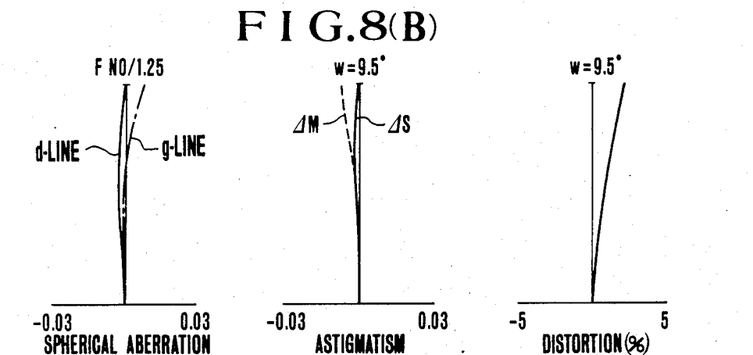
Figure 8C:
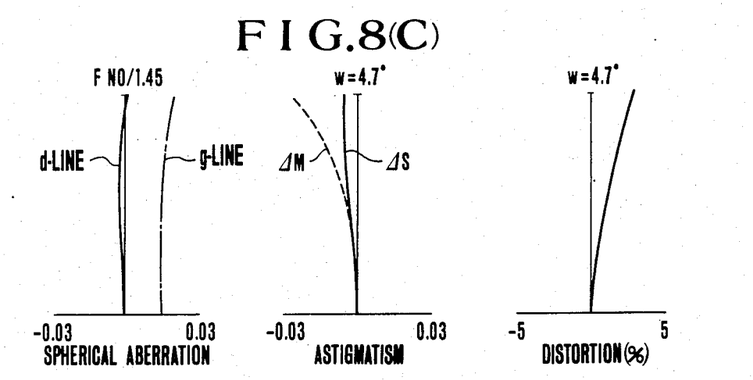

In the graphs of the aberrations, d and g indicate the spherical aberrations of d-line and g-line respectively, and $\Delta S$ and $\Delta M$ indicate the sagittal and meridional image surfaces respectively.

EXAMPLE 1

| | F = 1.0–5.7 | | FNO = 1:1.2–1.4 | $2\omega = 48.8°–9.1°$ |
|---|---|---|---|---|
| | R1 = 14.892 | D1 = 0.23 | N1 = 1.80518 | $\nu 1$ = 25.4 |
| | R2 = 4.692 | D2 = 0.92 | N2 = 1.60311 | $\nu 2$ = 60.7 |
| | R3 = −11.615 | D3 = 0.02 | | |
| | R4 = 3.641 | D4 = 0.51 | N3 = 1.69680 | $\nu 3$ = 55.5 |
| | R5 = 10.977 | D5 = Variable | | |
| | R6 = 10.296 | D6 = 0.11 | N4 = 1.77250 | $\nu 4$ = 49.6 |
| | R7 = 1.602 | D7 = 0.44 | | |
| | R8 = −2.011 | D8 = 0.11 | N5 = 1.73500 | $\nu 5$ = 49.8 |
| | R9 = 2.012 | D9 = 0.36 | N6 = 1.84666 | $\nu 6$ = 23.9 |
| | R10 = −36.378 | D10 = Variable | | |
| | R11 = −2.501 | D11 = 0.11 | N7 = 1.69680 | $\nu 7$ = 55.5 |
| | R12 = −31.827 | D12 = Variable | | |
| fIV { | R13 = 7.239 | D13 = 0.48 | N8 = 1.71300 | $\nu 8$ = 33.8 |
| | R14 = −2.911 | D14 = 0.02 | | |
| | R15 = ∞ | D15 = 0.68 | N9 = 1.51633 | $\nu 9$ = 64.1 |
| | R16 = ∞ | D16 = 0.55 | | |
| | R17 = Stop | D17 = 0.23 | | |
| | R18 = 5.153 | D18 = 0.34 | N10 = 1.71700 | $\nu 10$ = 47.9 |
| | R19 = −16.432 | D19 = 0.32 | | |
| | R20 = −2.012 | D20 = 0.11 | N11 = 1.84666 | $\nu 11$ = 23.9 |
| fV1 { | R21 = −4.057 | D21 = 0.02 | | |
| | R22 = 2.052 | D22 = 0.44 | N12 = 1.69680 | $\nu 12$ = 55.5 |
| | R23 = 9.610 | D23 = 0.93 | | |
| | R24 = 4.314 | D24 = 0.13 | N13 = 1.80518 | $\nu 13$ = 25.4 |
| | R25 = 1.301 | D25 = 0.30 | | |
| | R26 = −18.306 | D26 = 0.28 | N14 = 1.51633 | $\nu 14$ = 64.1 |
| fV2 { | R27 = −2.838 | D27 = 0.02 | | |
| | R28 = 1.749 | D28 = 0.48 | N15 = 1.64850 | $\nu 15$ = 53.0 |
| | R29 = −6.271 | D29 = 0.23 | | |
| | R30 = ∞ | D30 = 0.63 | N16 = 1.51633 | $\nu 16$ = 64.1 |
| | R31 = ∞ | | | |

| f | 1 | 2.8 | 5.7 |
|---|---|---|---|
| D5 | 0.1815 | 1.9310 | 2.6580 |
| D10 | 2.5904 | 0.6226 | 0.3084 |
| D12 | 0.3592 | 0.5776 | 0.1648 |

EXAMPLE 2

| | F = 1.0–5.7 | | FNO = 1:1.2–1.4 | $2\omega = 48.8°–9.1°$ |
|---|---|---|---|---|
| | R1 = 14.892 | D1 = 0.23 | N1 = 1.80518 | $\nu 1$ = 25.4 |
| | R2 = 4.692 | D2 = 0.92 | N2 = 1.60311 | $\nu 2$ = 60.7 |
| | R3 = −11.615 | D3 = 0.02 | | |
| | R4 = 3.641 | D4 = 0.51 | N3 = 1.69680 | $\nu 3$ = 55.5 |
| | R5 = 10.977 | D5 = Variable | | |
| | R6 = 10.296 | D6 = 0.11 | N4 = 1.77250 | $\nu 4$ = 49.6 |
| | R7 = 1.602 | D7 = 0.44 | | |
| | R8 = −2.011 | D8 = 0.11 | N5 = 1.73500 | $\nu 5$ = 49.8 |
| | R9 = 2.012 | D9 = 0.36 | N6 = 1.84666 | $\nu 6$ = 23.9 |
| | R10 = −36.377 | D10 = Variable | | |
| | R11 = −2.501 | D11 = 0.11 | N7 = 1.69680 | $\nu 7$ = 55.5 |
| | R12 = −31.827 | D12 = Variable | | |
| fIV { | R13 = 7.239 | D13 = 0.48 | N8 = 1.71300 | $\nu 8$ = 53.8 |

-continued

|  | | | | |
|---|---|---|---|---|
|  | R14 = −2.911 | D14 = 0.02 | | |
|  | R15 = ∞ | D15 = 0.68 | N9 = 1.51633 | ν9 = 64.1 |
|  | R16 = ∞ | D16 = 0.55 | | |
|  | R17 = Stop | D17 = 0.23 | | |
| fV1 { | R18 = 4.613 | D18 = 0.34 | N10 = 1.74400 | ν10 = 44.7 |
|  | R19 = −20.727 | D19 = 0.32 | | |
|  | R20 = −2.063 | D20 = 0.11 | N11 = 1.84666 | ν11 = 23.9 |
|  | R21 = −5.327 | D21 = 0.02 | | |
|  | R22 = 2.329 | D22 = 0.44 | N12 = 1.69680 | ν12 = 55.5 |
|  | R23 = 60.042 | D23 = 0.98 | | |
| fV2 { | R24 = 4.236 | D24 = 0.12 | N13 = 1.80518 | ν13 = 25.4 |
|  | R25 = 1.406 | D25 = 0.31 | | |
|  | R26 = −7.568 | D26 = 0.28 | N14 = 1.51633 | ν14 = 64.1 |
|  | R27 = −2.264 | D27 = 0.02 | | |
|  | R28 = 1.764 | D28 = 0.48 | N15 = 1.72000 | ν15 = 50.2 |
|  | R29 = −38.991 | D29 = 0.23 | | |
|  | R30 = ∞ | D30 = 0.62 | N16 = 1.51633 | ν16 = 64.1 |
|  | R31 = ∞ | | | |

| D/f | 1 | 2.8 | 5.7 |
|---|---|---|---|
| D5 | 0.1815 | 1.9309 | 2.6579 |
| D10 | 2.5904 | 0.6226 | 0.3084 |
| D12 | 0.3591 | 0.5776 | 0.1648 |

EXAMPLE 3

| F = 1.0–5.7 | | FNO = 1:1.2–1.5 | | 2ω = 48.3°–9.0° |
|---|---|---|---|---|
|  | R1 = 15.869 | D1 = 0.22 | N1 = 1.80518 | ν1 = 25.4 |
|  | R2 = 4.706 | D2 = 0.89 | N2 = 1.60311 | ν2 = 60.7 |
|  | R3 = −10.042 | D3 = 0.02 | | |
|  | R4 = 3.390 | D4 = 0.49 | N3 = 1.69680 | ν3 = 55.5 |
|  | R5 = 8.513 | D5 = Variable | | |
|  | R6 = 8.376 | D6 = 0.11 | N4 = 1.77250 | ν4 = 49.6 |
|  | R7 = 1.593 | D7 = 0.39 | | |
|  | R8 = −1.969 | D8 = 0.11 | N5 = 1.77250 | ν5 = 49.6 |
|  | R9 = 1.970 | D9 = 0.36 | N6 = 1.84666 | ν6 = 23.9 |
|  | R10 = −22.569 | D10 = Variable | | |
|  | R11 = −2.486 | D11 = 0.11 | N7 = 1.69680 | ν7 = 55.5 |
|  | R12 = −34.787 | D12 = Variable | | |
| fIV { | R13 = 9.797 | D13 = 0.48 | N8 = 1.71300 | ν8 = 53.8 |
|  | R14 = −2.477 | D14 = 0.47 | | |
|  | R15 = Stop | D15 = 0.23 | | |
|  | R16 = 4.970 | D16 = 0.34 | N9 = 1.71300 | ν9 = 53.8 |
|  | R17 = −16.154 | D17 = 0.27 | | |
| fV1 { | R18 = −2.064 | D18 = 0.11 | N10 = 1.84666 | ν10 = 23.9 |
|  | R19 = −4.127 | D19 = 0.02 | | |
| Z | R20 = 1.993 | D20 = 0.40 | N11 = 1.69680 | ν11 = 55.5 |
|  | R21 = 8.800 | D21 = 0.91 | | |
| fV2 { | R22 = 3.283 | D22 = 0.11 | N12 = 1.80518 | ν12 = 25.4 |
|  | R23 = 1.230 | D23 = 0.29 | | |
|  | R24 = −6.356 | D24 = 0.31 | N13 = 1.51633 | ν13 = 64.1 |
|  | R25 = −2.066 | D25 = 0.02 | | |
|  | R26 = 1.483 | D26 = 0.39 | N14 = 1.60311 | ν14 = 60.7 |
|  | R27 = −132.819 | D27 = 0.22 | | |
|  | R28 = ∞ | D28 = 0.62 | N15 = 1.516633 | ν15 = 64.1 |
|  | R29 = ∞ | | | |

| f | 1.0 | 2.8 | 5.7 |
|---|---|---|---|
| D5 | 0.1809 | 1.9063 | 2.6234 |
| D10 | 2.5863 | 0.6451 | 0.3349 |
| D12 | 0.3392 | 0.5549 | 0.1480 |

EXAMPLE 4

| F = 1.0–5.7 | FNO = 1:1.25–1.45 | | 2ω = 50.3°–9.4° |
|---|---|---|---|
| R1 = 14.245 | D1 = 0.22 | N1 = 1.80518 | ν1 = 25.4 |
| R2 = 4.488 | D2 = 0.88 | N2 = 1.60311 | ν2 = 60.7 |
| R3 = −11.110 | D3 = 0.02 | | |
| R4 = 3.482 | D4 = 0.49 | N3 = 1.69680 | ν3 = 55.5 |
| R5 = 10.500 | D5 = Variable | | |
| R6 = 9.849 | D6 = 0.11 | N4 = 1.77250 | ν4 = 49.6 |
| R7 = 1.532 | D7 = 0.42 | | |
| R8 = −1.924 | D8 = 0.11 | N5 = 1.73500 | ν5 = 49.8 |
| R9 = 1.925 | D9 = 0.35 | N6 = 1.84666 | ν6 = 23.9 |

-continued

|  | | | | |
|---|---|---|---|---|
| | R10 = −34.795 | D10 = Variable | | |
| | R11 = −2.392 | D11 = 0.11 | N7 = 1.69680 | ν7 = 55.5 |
| | R12 = −30.443 | D12 = Variable | | |
| fVI | R13 = 9.794 | D13 = 0.48 | N8 = 1.71300 | ν8 = 53.8 |
| | R14 = −2.514 | D14 = 0.34 | | |
| | R15 = Stop | D15 = 0.22 | | |
| | R16 = 5.844 | D16 = 0.33 | N9 = 1.69680 | ν9 = 55.5 |
| | R17 = −8.457 | D17 = 0.24 | | |
| | R18 = −2.141 | D18 = 0.13 | N10 = 1.84666 | ν10 = 23.9 |
| fV1 | R19 = −4.490 | D19 = 0.02 | | |
| | R20 = 2.059 | D20 = 0.43 | N11 = 1.69680 | ν11 = 55.5 |
| | R21 = 10.866 | D21 = 0.94 | | |
| | R22 = 2.706 | D22 = 0.11 | N12 = 1.84666 | ν12 = 23.9 |
| | R23 = 1.167 | D23 = 0.33 | | |
| | R24 = −5.443 | D24 = 0.28 | N13 = 1.51633 | ν13 = 64.1 |
| fV2 | R25 = −2.351 | D25 = 0.02 | | |
| | R26 = 1.480 | D26 = 0.47 | N14 = 1.62299 | ν14 = 58.2 |
| | R27 = −22.532 | D27 = 0.22 | | |
| | R28 = ∞ | D28 = 0.58 | N15 = 1.51633 | ν15 = 64.1 |
| | R29 = ∞ | | | |

| D/f | 1 | 2.8 | 5.7 |
|---|---|---|---|
| D5 | 0.1736 | 1.8470 | 2.5424 |
| D10 | 2.4778 | 0.5955 | 0.2950 |
| D12 | 0.3333 | 0.5423 | 0.1474 |

What is claimed is:

1. A zoom lens comprising:
a varifocal section including, from front to rear, a first lens unit of positive refractive power for focusing, a second lens unit of negative refractive power movable for variation, a third lens unit for compensation which is movable simultaneously with said second lens unit and a fourth lens unit of positive refractive power; and
an image forming section arranged on the image side of said varifocal section and including a front lens unit and a rear lens units with an air space therebetween,
said front lens unit consisting of a positive lens with its front surface of strong curvature convex toward the front, a negative meniscus lens of forward concavity, and a positive lens with its front surface of strong curvature convex toward the front, and
said rear lens unit consisting of a negative meniscus lens of forward convexity, a positive meniscus lens of forward concavity, and a positive lens with its front surface of strong curvature convex toward the front.

2. A zoom lens according to claim 1, wherein the frontmost positive lens of said front lens unit is in the bi-convex form, said zoom lens satisfying the following conditions:

(1) $0.8 < |RIV2/fIV| < 1.1$ (where $RIV2 < 0$)
(2) $1.3 < fV1/fV < 1.6$
(3) $1.5 < |RV1/RV3| < 3.0$ (where $RV1 > 0, RV3 < 0$)

(4) $0.5 < \left| \frac{RV2 - RV3}{RV2 + RV3} \right| < 0.9$ (5) $0.7 < RV5/fV < 0.9$ (6) $1.0 < \left| \frac{RV8 - RV9}{RV8 + RV9} \right| < 1.6$ (7) $0.3 < DV6/fV < 0.4$
(8) $1.6 < NV6 < 1.8$ where RIV2 is the radius of curvature of the rear surface of said fixed positive lens, RVi is the radius of curvature of the i-th lens surface counting from front in said image forming section, DVi is the i-th lens thickness or air separation, NVi is the refractive index for the D-line of the glass of the i-th lens element, fIV is the focal length of said fixed positive lens, fV is the focal length of said image forming section, and fV1 and fV2 are the focal lengths of said front and said rear lens units respectively.

* * * * *